(12) United States Patent
Ohmori et al.

(10) Patent No.: US 7,037,007 B2
(45) Date of Patent: May 2, 2006

(54) LENS HOOD, AND IMAGING DEVICE

(75) Inventors: Norikatsu Ohmori, Saitama (JP); Akira Murakami, Kanagawa (JP)

(73) Assignee: Sony Corporation, (JP)

( * ) Notice: Subject to any disclaimer, the term of this patent is extended or adjusted under 35 U.S.C. 154(b) by 97 days.

(21) Appl. No.: 10/871,448

(22) Filed: Jun. 18, 2004

(65) Prior Publication Data

US 2005/0117900 A1 Jun. 2, 2005

(30) Foreign Application Priority Data

Jun. 24, 2003 (JP) ............................ P2003-180022

(51) Int. Cl.
*G03B 11/04* (2006.01)
*G02B 23/16* (2006.01)

(52) U.S. Cl. ...................... 396/448; 396/544; 359/511; 359/611; 348/375

(58) Field of Classification Search ................ 396/448, 396/544; 359/511, 611, 612
See application file for complete search history.

(56) References Cited

U.S. PATENT DOCUMENTS

| | | | | | |
|---|---|---|---|---|---|
| 3,836,985 | A | * | 9/1974 | Lange | 396/448 |
| 4,045,117 | A | * | 8/1977 | Lerner | 359/612 |
| 5,294,954 | A | * | 3/1994 | Nomura et al. | 396/448 |
| 5,631,772 | A | * | 5/1997 | Mizukawa | 359/511 |
| 5,745,803 | A | * | 4/1998 | Ito | 396/83 |
| 6,443,634 | B1 | * | 9/2002 | Tsuboi | 396/448 |

* cited by examiner

*Primary Examiner*—W. B. Perkey
(74) *Attorney, Agent, or Firm*—Lerner, David, Littenberg, Krumholz & Mentlik, LLP (57) ABSTRACT

A lens hood with lens covers that need not be attached to and detached from a lens unit and are easily openable and closable relative to each other. The lens hood includes a hood body attached to the front of a lens to prevent unnecessary light from being incident upon the lens, a pair of lens covers installed inside the hood body to be pivotable about an axis perpendicular to the optical axis of the lens and movable between a closed position where they will cover the lens and an opened position where they will be outside the field of view of the lens, and a cover operating mechanism that operates in conjunction with the sliding of an operator installed slidably to the hood body to pivot the lens covers in opposite directions, respectively, and to pivot the pair of lens covers between the opened and closed positions.

8 Claims, 11 Drawing Sheets

LENS HOOD, AND IMAGING DEVICE

BACKGROUND OF THE INVENTION

1. Field of the Invention

The present invention relates to a lens hood attached to the front of a lens to prevent unnecessary light from being incident upon the lens, and an imaging device provided with the lens hood.

This application claims the priority of the Japanese Patent Application No. 2003-180022 filed on Jun. 24, 2003, the entirety of which is incorporated by reference herein.

2. Description of the Related Art

Conventionally, a lens hood is attached to the front of a lens in an imaging device such as a still camera, video camera or the like, as necessary, to prevent unnecessary light from being incident upon the lens during photography (cf. the Japanese Published Unexamined Patent Application No. 2000-180918). Also, a lens cover is attached to the camera device after completion of an intended series of photography to protect the lens so that the lens will not be damaged or no dust or the like will adhere to the lens surface (cf. the Japanese Published Unexamined Patent Application No. 1992-94271).

Figure 1:
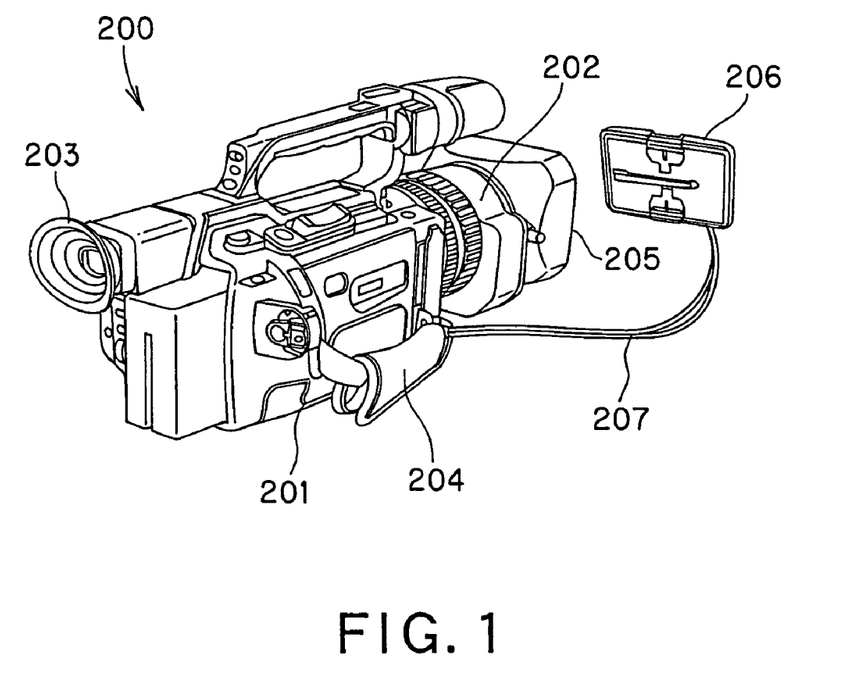
FIG. 1 is a perspective view of a conventional camera device having a lens hood and lens cover attached thereto.

FIG. 1 shows a conventional camera/video recorder (will be referred to as "video camera" hereunder), for example. The video camera is generally indicated with a reference 200. As shown, the video camera 200 includes a body unit 201, a lens unit 202 provided at the front of the body unit 201 with a field lens included in the lens unit 202, facing forward, and a viewfinder 203 provided at the rear top of the body unit 201 and facing backward (in a direction opposite to that of the field lens in the lens unit 202). Gripping a holder 204 provided at one lateral side of the body unit 201, the photographer (will be referred to as "user" hereunder) peeps into the viewfinder 203 to see a field of view the video camera is going to capture. A lens hood 205 is attached to the front of the lens unit 202, and further a lens cover 206 is removably attached to the lens hood 205.

Attaching and detaching of the lens cover to the lens hood before and after making a photography with the aforementioned camera device are very troublesome. Especially, in the case of the video camera 200, it is difficult for the user to detach the lens cover 206 from the front of the lens hood 205 with the eye being set to the viewfinder 203 while holding the holder 204 of the body unit 201 by gripping. So, to attach or detach the lens cover 206, the user has to re-hold the video camera 200 once to direct the lens hood 205 toward himself or herself. Also, making sure whether the lens cover 206 is attached in place as well as re-holding the video camera 200 is very troublesome.

Also, in the case of the video camera 200, the lens cover 206 is connected to the body unit 201 with a string 207 to prevent the detached lens cover 206 from being missing, as shown in FIG. 1. However, the lens cover 206 detached for making a photography will depend from the body unit 201, which will interfere with and bother the user.

On the other hand, some of small camera devices using a small lens include a camera whose lens cover is automatically slid to a position outside the lens and a camera whose lens cover is opened to outside. In a conventional camera of a type whose lens unit is projected largely forward, like the lens unit 202 in the video camera 200, and a conventional camera of a type whose lens hood is to be attached to the front of the camera, like the lens hood 205 of the video camera 200, however, there is not provided any mechanism to operate (open and close) a lens cover (like the lens cover 206) because such a mechanism will lead to a larger front portion of the camera. Most of the conventional camera devices of such types have a lens cover (like the lens cover 206) that is to be attached and detached at each time of photography, which is very inconvenient.

OBJECT AND SUMMARY OF THE INVENTION

It is therefore an object of the present invention to overcome the above-mentioned drawbacks of the related art by providing a lens hood having lens covers easily openable from each other and closable to each other and which have not to be attached and detached at each photography.

Also the present invention has another object to provide an imaging device provided with the above-mentioned lens hood with the lens covers, according to the present invention, to assure an improved operability of the imaging device.

The above object can be attained by providing a lens hood including, according to the present invention, a hood body attached to the front of a lens to prevent unnecessary light from being incident upon the lens; a pair of lens covers installed inside the hood body to be pivotable about an axis perpendicular to the optical axis of the lens and between a closed position where they will cover the lens and an opened position where they will be outside the field of view of the lens; and a cover operating mechanism which operates in conjunction with sliding of an operator installed slidably to the hood body to pivot the lens covers in pair in opposite directions, respectively, to pivot the pair of lens covers between the opened and closed positions.

In the above lens hood according to the present invention, the pair of lens covers provided inside the hood body can easily be opened from each other and closed to each other by sliding the operator of the cover operating mechanism provided on the hood body. With the pair of lens covers being placed in the opened position, the hood body prevents unnecessary light from being incident upon the lens. The pair of lens covers set in the closed position will protect the lens by covering the latter.

Also, the above object can be attained by providing an imaging device including, according to the present invention, a device body; a lens unit provided at the front of the device body for a field lens to face forward; and a lens hood attached to the front of the lens unit, the lens hood including a hood body attached to the front of a lens to prevent unnecessary light from being incident upon the lens; a pair of lens covers installed inside the hood body to be pivotable about an axis perpendicular to the optical axis of the lens and between a closed position where they will cover the lens and an opened position where they will be outside the field of view of the lens; and a cover operating mechanism which operates in conjunction with sliding of an operator installed slidably to the hood body to pivot the lens covers in pair in opposite directions, respectively, to pivot the pair of lens covers between the opened and closed positions.

In the above imaging device, the lens hood is attached to the front of the lens unit provided at the front of the device body, and the pair of lens covers provided inside the hood body can easily be opened from each other, and closed to each other, by sliding the operator of the cover operating mechanism provided on the hood body. Therefore, it is possible to save the labor and time for attaching and detaching the lens covers before and after making a photography with the imaging device. During photography, the hood body can prevent unnecessary light from being incident upon the lens, and after making a photography, the pair of lens covers can protect the lens by covering the latter.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

The lens hood and imaging device according to the present invention will be described in detail concerning their embodiments with reference to the accompanying drawings.

First the imaging device to which the lens hood according to the present invention is installed will be described.

Figure 2:
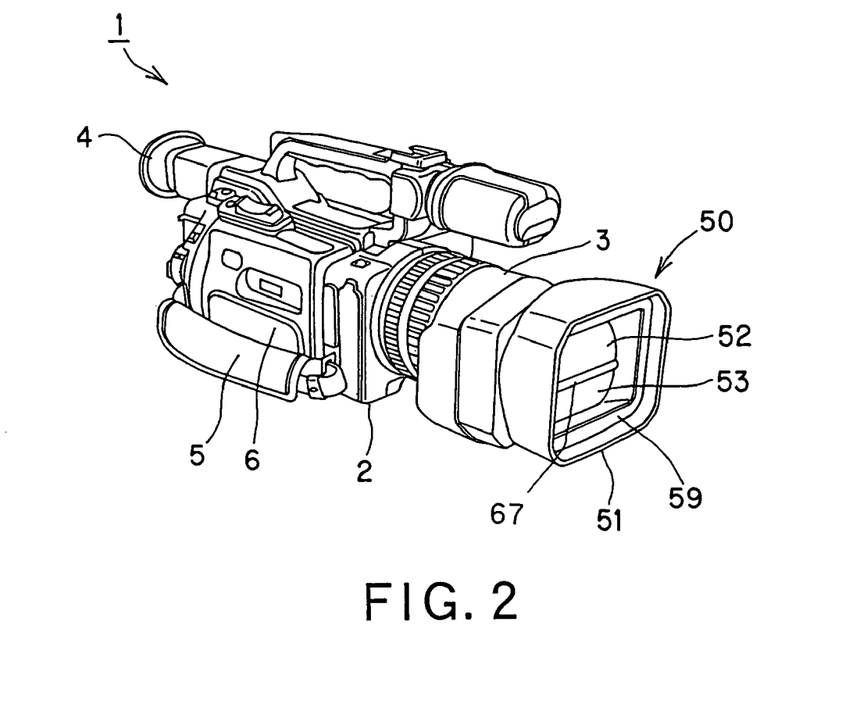
FIG. 2 is also a perspective view, from the front, of a camera device according to the present invention.
Figure 3:
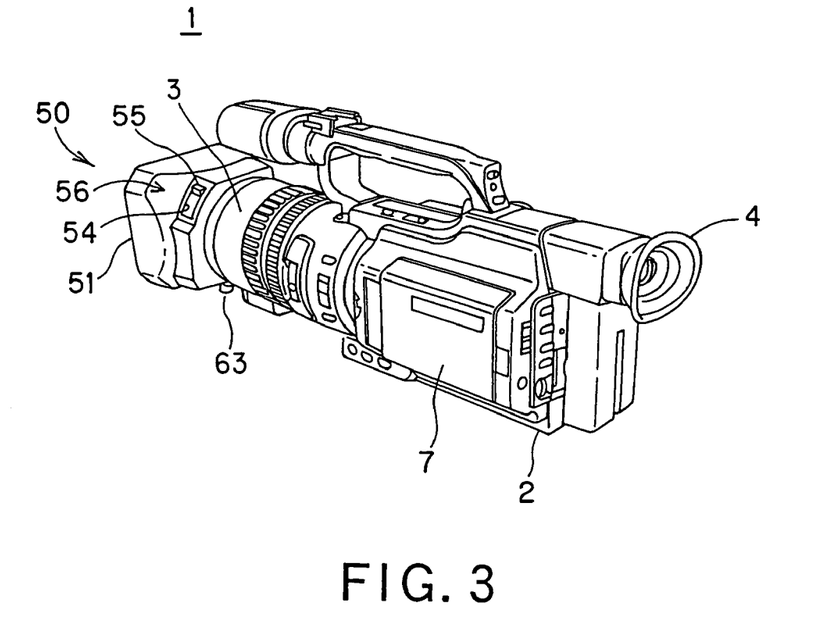
FIG. 3 is a perspective view, from the rear, of the camera device in FIG. 2.

Referring now to FIGS. 2 and 3, for example, there are schematically illustrated in the form of perspective views a camera/video recorder (will be referred to as "video camera" hereunder) as an embodiment of the present invention. The video camera is generally indicated with a reference 1. As shown, the video camera 1 includes a camera body 2 formed to have a generally rectangular-parallelepiped shape. The camera body 2 has provided therein an imaging unit to take a picture of an object, a display unit to display the captured image, a sound recording unit to record sounds, a recording/playback unit to record and reproduce video and audio signals from the imaging unit and sound recording unit, respectively, control buttons and switches for controlling various operations of the video camera 1.

Figure 4:
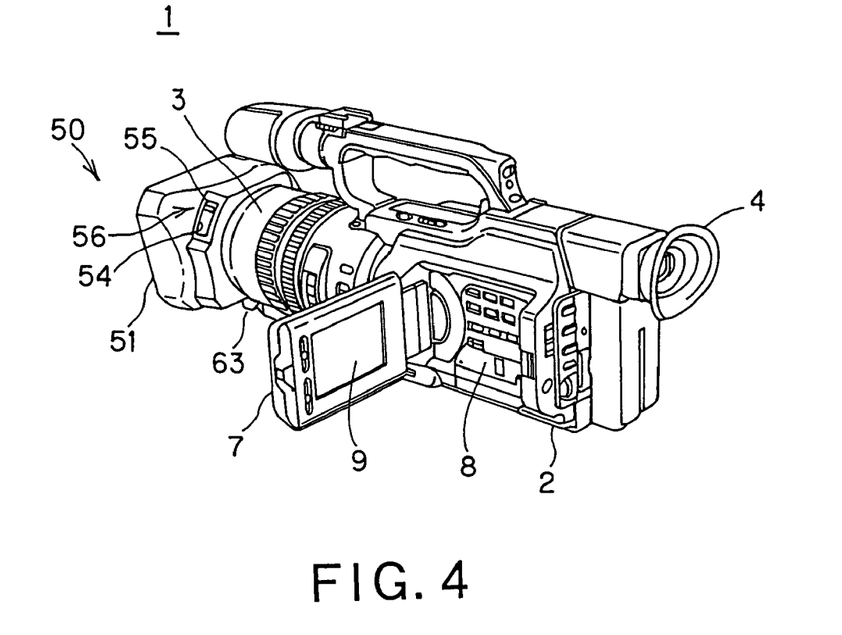
FIG. 4 is perspective view of the camera device, showing a liquid crystal display (LCD) panel of the device being in an opened position.

A lens unit 3 having a field lens facing forward is fixed to the front of the camera body 2, and a lens hood 50 according to the present invention, which will be described in detail later), is removably attached to the front of the lens unit 3. To the rear of the camera body 2, there is fixed a viewfinder 4 in which the photographer (will be referred to as "user" hereunder) peeps to see a field of view through the field lens. Also, to one lateral side of the camera body 2, there is fixed a holder 6 the user will grip when holding the video camera 1. The holder 6 has a gripping belt 5 provided thereon. To the side of the camera body 2 opposite to the side where the holder 6 is fixed, there is fixed a display unit 7 which is openable and closable, as shown in FIGS. 3 and 4. When placed in an closed position as shown in FIG. 3, the display unit 7 is received in a panel housing concavity 8 formed at the lateral side of the camera body 2. When in an opened position as shown in FIG. 4, a liquid crystal display (LCD) panel 9 of the display unit 7, provided on the main side of the latter opposite to the panel housing concavity 8, will display an image captured through the field lens. Of course, this image can also be viewed through the viewfinder 4.

Thus, the user can make a photography while peeping, with one of his or her eyes, into the viewfinder 4 at the back of the camera body 2 while gripping, with the single hand, the holder 6 provided at the one lateral side of the camera body 2, or while watching the LCD panel 9 of the display unit 7 opened at the other lateral side of the camera body 2.

Next, the lens hood 50 with lens covers according to the present invention will be illustrated and described.

Figure 5:
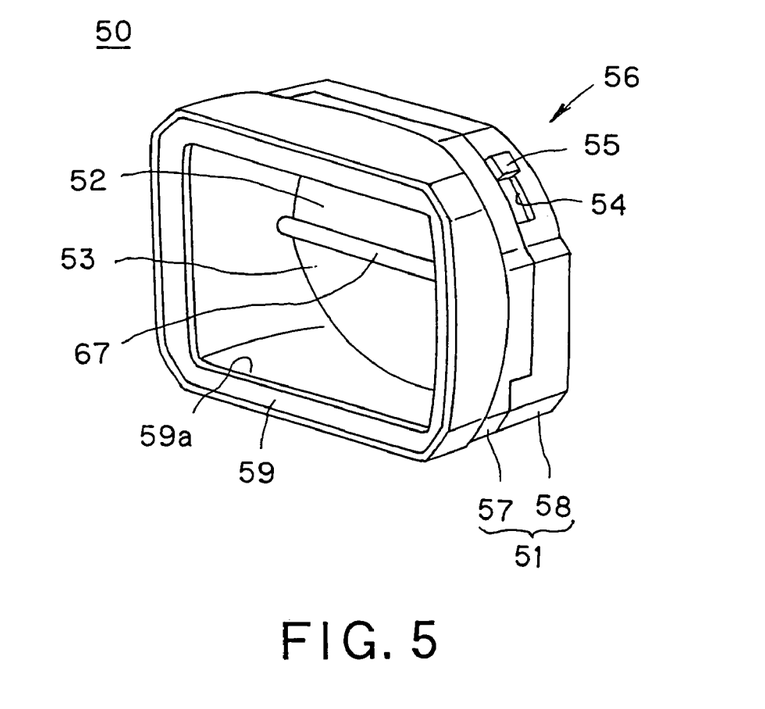
FIG. 5 is a perspective view of a lens hood according to the present invention, showing the appearance of the lens hood.
Figure 6:
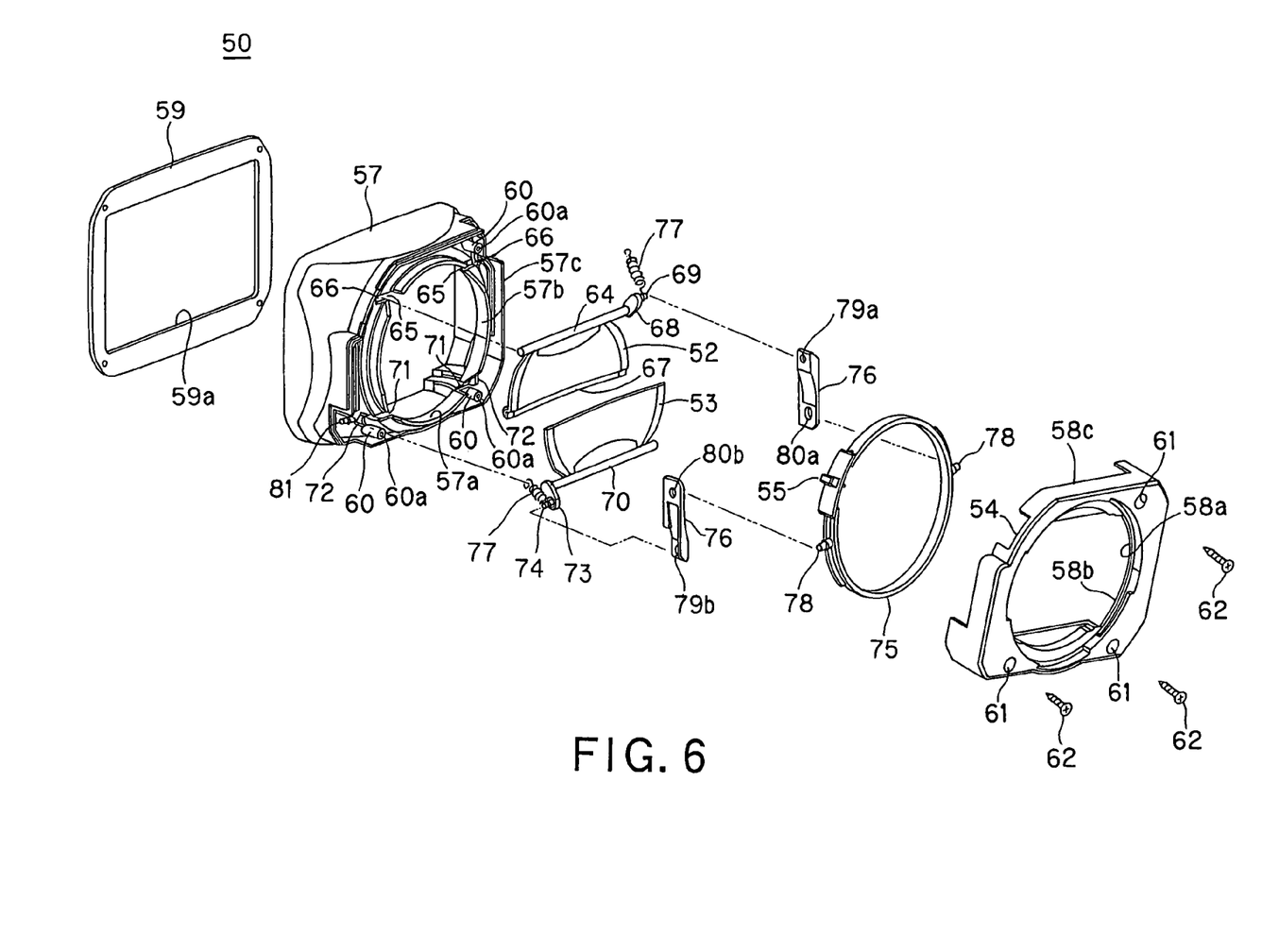
FIG. 6 is an exploded perspective view of the lens hood in FIG. 5.

As shown in FIGS. 5 and 6, the lens hood 50 includes a hood body 51 installed removably to the front of the lens unit 3, an upper lens cover 52 and lower lens cover 53 in pair, installed inside the hood body 51 to be openable from each other and closable to each other, and a cover operating mechanism 56 which opens the pair of lens covers, upper and lower, 52 and 53 from each other, and also closes them to each other, by sliding an operating projection 55 protruding out of a sliding hole 54 formed in the hood body 51.

The hood body 51 is located before the field lens of the lens unit 3 to prevent unnecessary light from being obliquely incident upon the field lens. It is an assembly of a front hood member 57 and read cover member 58.

The front hood member 57 is shaped to have a larger diameter from the base end thereof in which a circular opening 57a the field lens of the lend unit 3 faces toward the free end thereof. To the front side of the front hood member 57, there is fixed a light-shielding plate 59 having a rectangular opening 59a formed therein and which prevents unnecessary light from being incident upon the field lens from front. A flat, generally circular, inner wall 57b defining an opening 57a is formed on the back of the front hood member 57, and a flat, generally rectangular, outer wall 57c defining the lateral side of the hood body 51 is formed outside the inner wall 57b. Both the inner and outer walls 57b and 57c are rising. Also, a projecting positioning pin 60 is formed at the back of the front hood member 57 and in each of three corners between the inner and outer walls 57b and 57c. A screw hole 60a is formed in the center of the positioning pin 60.

The rear cover member 58 is formed to have a generally rectangular box-like shape and has a circular opening 58a formed nearly in the bottom center thereof correspondingly to the opening 57a in the front hood member 57. A flat, generally circular, inner wall 58b forming an opening 58a is formed on the bottom of the rear cover member 58, and a flat, generally rectangular, outer wall 58c forming the lateral side of the hood body 51 is formed outside the inner wall 58b. Both the inner and outer walls 58b and 58c are rising. Also, correspondingly to the positioning pin 60 on the front hood member 57, a projecting positioning cap (not shown) is formed at the bottom of the read cover member 58 and in each of three corners between the inner and outer walls 58b and 58c. There is formed in the bottom of the positioning cap at through-hole 61 through which a screw 62 is passed. Also, a cut defining the sliding hole 54 is formed in the outer wall 58c of the rear cover member 58.

The above front hood member 57 and rear cover member 58 are joined integrally to each other by fitting the positioning pin 60 into the positioning cap with the inner walls 57b and 58b being made to abut each other and the outer walls 57c and 58c being made to abut each other, respectively, and driving the screw 62 into the screw hole 60a in the positioning pin 60 through the through-hole 61 in the positioning cap. Thus, the hood body 51 is formed to define between the inner walls 57b and 58b and outer walls 57c and 58c a space in which the cover operating mechanism 56, which will be described in detail later, is to be housed.

A set screw 63 is installed rotatably at the bottom of the hood body 51 as shown in FIGS. 3 and 4. By driving the set screw 63 into a screw hole (not shown) formed in the bottom of the lens unit 3, the lens hood 50 can be attached to the front of the lens unit 3.

As shown in FIGS. 6 to 10, the upper lens cover 52 is formed to have a generally semi-circular shape to cover the upper half of the field lens facing forward through the openings 57a and 58a in the hood body 51, and has a rotating shaft 64 formed integrally at the base end thereof. On the other hand, the front hood member 57 has formed therein a pair of shaft recesses 65 in which the rotating shaft 64 is pivoted at opposite ends thereof, and has also formed thereon a pair of positioning portions 66 which limit the rotating shaft 64 from moving in the axial direction. With the rotating shaft 64 being engaged in the pair of shaft recesses 65, the upper lens cover 52 is supported rotatably in a direction perpendicular to the optical axis. Also, the upper lens cover 52 has formed at the free end thereof a stepped overlapping portion 67 which overlaps the free end portion of the lower lens cover 53. Also, the rotating shaft 64 has provided at one end thereof an arm portion 68 extending in a direction perpendicular to the rotating shaft 64 and which has an outwardly projecting boss 69 formed at the free end of the arm portion 68.

The lower lens cover 53 is formed to have a generally semi-circular shape to cover the lower half of the field lens facing forward through the openings 57a and 58a in the hood body 51, and has a rotating shaft 70 formed integrally at the base end thereof. On the other hand, the front hood member 57 has also formed therein a pair of shaft recesses 71 in which the rotating shaft 70 is pivoted at opposite ends thereof, and has formed thereon a pair of positioning portions 72 which limit the rotating shaft 70 from moving in the axial direction. With the rotating shaft 70 being engaged in the pair of shaft recesses 71, the lower lens cover 53 is supported rotatably in a direction perpendicular to the optical axis. Also, the rotating shaft 70 has provided at one end thereof an arm portion 73 extending in a direction perpendicular to the rotating shaft 70 and which has an outwardly projecting boss 74 formed at the free end thereof.

Also, when the front hood member 57 and rear cover member 58 being joined integrally to each other, the rotating shafts 64 and 70 of the upper and lower lens covers 52 and 53, respectively, will be supported at the rear sides thereof on the inner walls 58b of the rear cover member 58. Thus, the rotating shafts 64 and 70 of the upper and lower lens covers 52 and 53, respectively, can positively be pivoted to provide a structure which can withstand an impact applied from the front.

Figure 8:
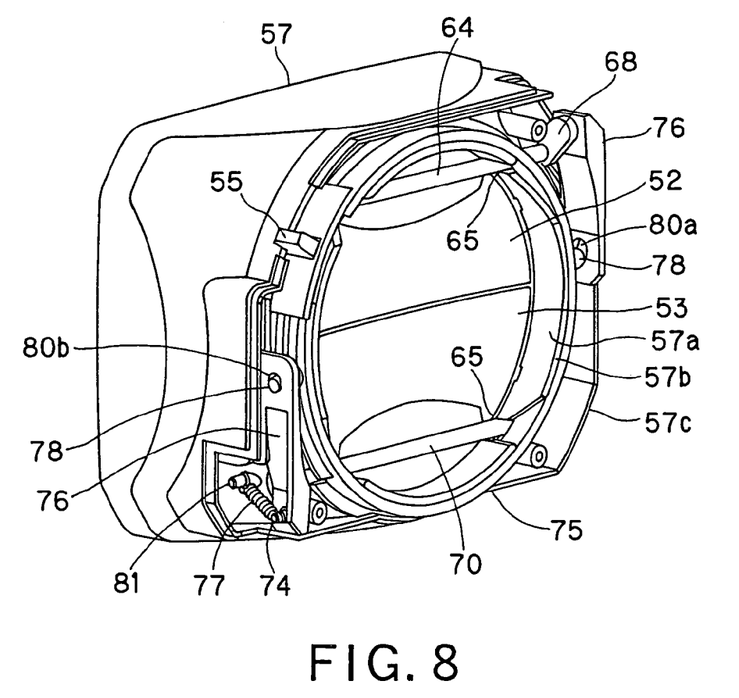
FIG. 8 is a perspective view of the lens hood in FIG. 5, showing the internal structure of the lens hood with the lens covers being closed to each other.
Figure 10:
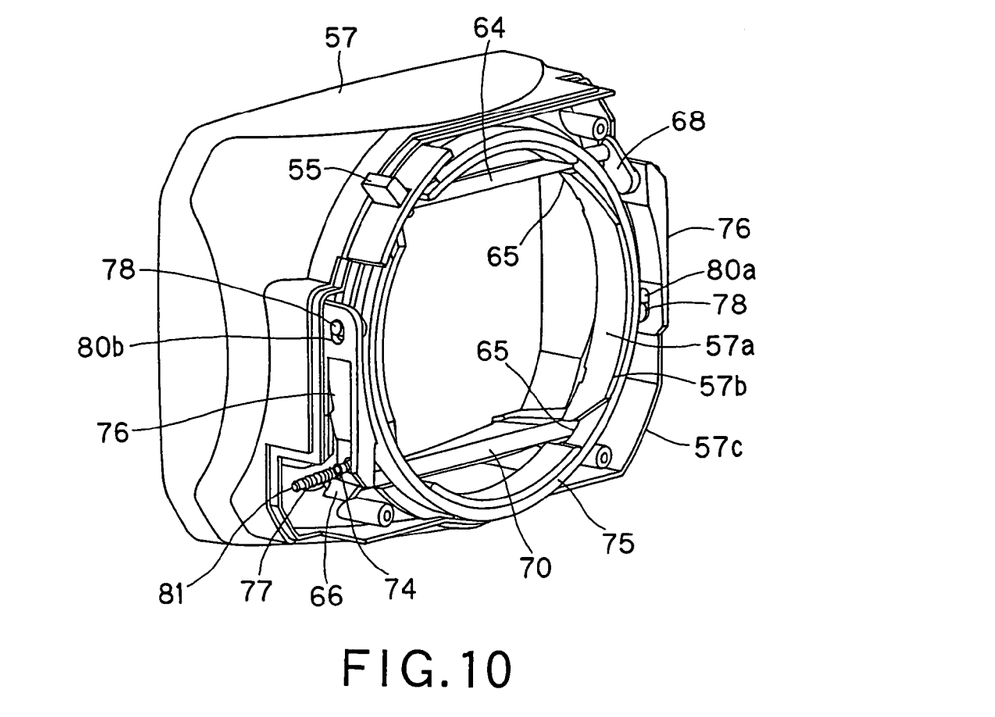
FIG. 10 is a perspective view of the lens hood in FIG. 5, showing the internal structure of the lens hood with the lens covers being opened from each other.

As best shown in FIGS. 6, 8 and 10, the cover operating mechanism 56 includes, inside the hood body 51, a ring-shaped member 75 fitted on the inner wall 57b of the front hood member 57, a pair of coupling members 76 to provide a coupling between the ring-shaped member 75 and arm portions 68 and 73 of the upper and lower lens covers 52 and 53, respectively, and a pair of helical extension springs 77 to force the upper and lower lens covers 52 and 53 in their pivoting directions, respectively.

The ring-shaped member 75 is installed to be pivotable about the optical axis while sliding on the inner wall 57b of the front hood member 57. Also, on the outer surface of the ring-shaped member 75, there is formed a pair of bosses 78 projecting outwardly from opposite positions, respectively. Also, on the outer surface of the ring-shaped member 75, there is formed integrally an operating projection 55 facing the outside through the aforementioned sliding hole 54 in the hood body 51.

The coupling members 76 have formed therein boss holes 79a and 79b, respectively, in which there are engaged the bosses 69 and 74 formed on the arm portions 68 and 73 of the upper and lower lens covers 52 and 53, respectively, and boss holes 80a and 80b, respectively, in which the bosses 78 on the ring-shaped member 75 are engaged, respectively.

The spiral extension springs 77 are hooked at one end thereof on the bosses 69 and 74, respectively, formed on the arm portions 68 and 73, respectively, of the upper and lower lens covers 52 and 53, and at the other end thereof on hook pins 81, respectively, each provided at each of the rear corners of the front hood member 57, opposite to each other.

In the cover operating mechanism 56, as the operating projection 55 facing the outside through the sliding hole 54 in the hood body 51 is slid about the optical axis, the upper and lower lens covers 52 and 53 will be pivoted about the rotating shafts 64 and 70, respectively, in opposite directions, respectively, as shown in FIGS. 7 to 10.

Since the upper and lower lens covers 52 and 53 are pivoted by the cover operating mechanism 56 in the same manner except for their pivoting in opposite directions, respectively, only the operation of the cover operating mechanism 56 for pivoting the lower lens cover 53 will be described by way of example herebelow.

Figure 11:
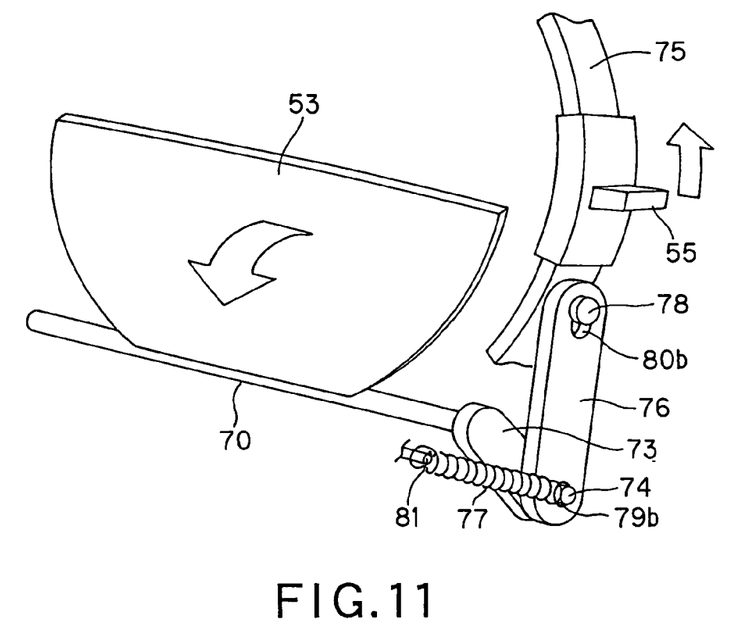
FIG. 11 is a perspective view of the substantial part of the lens hood in FIG. 5, explaining how the lens covers are opened from each other by a cover opening mechanism of the lens hood.

First, when the operating projection 55 is slid upward starting with the lower lens cover 53 being closed as shown in FIG. 11, the ring-shaped member 75 will be pivoted counterclockwise in FIG. 11, resulting in engagement of the boss 78a on the ring-shaped member 75 in the boss hole 80b in the coupling member 76, which engagement will cause the coupling member 76 to pivot upward. Then, the boss 74 on the arm portion 73 is engaged into the boss hole 79*b* in the coupling member 76, so that the arm portion 73 will be pulled upward against the force of the spiral extension spring 77. Thus, the rotating shaft 70 will be pivoted in a direction in which the lower lens cover 53 is opened.

Figure 12:
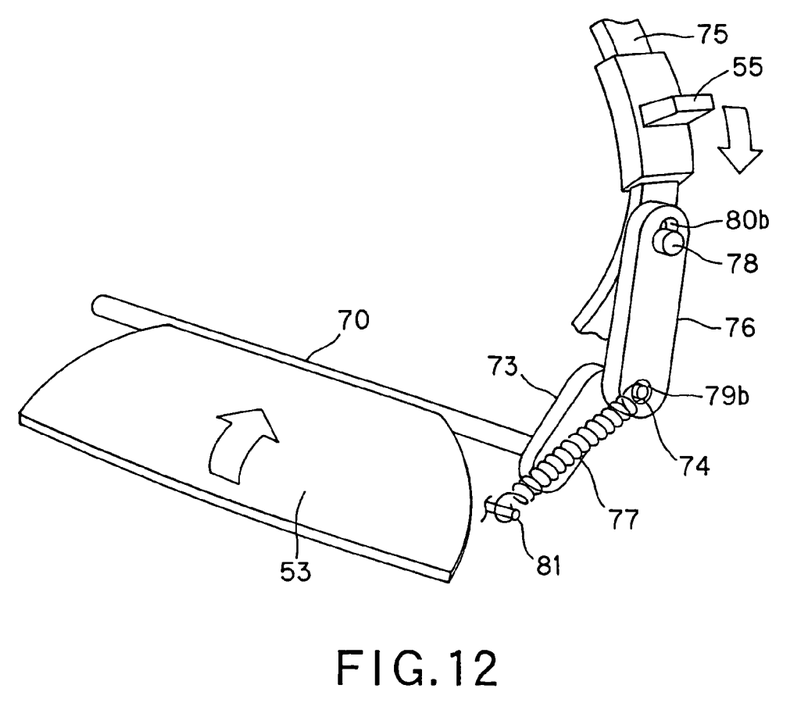
FIG. 12 is a perspective view of the substantial part of the lens hood in FIG. 5, explaining how the lens covers are closed to each other by the cover operating mechanism.

On the other hand, when the operating projection 55 is slid downward starting with the lower lens cover 53 being opened as shown in FIG. 12, the ring-shaped member 75 is pivoted clockwise in FIG. 12, resulting in engagement of the boss 78*a* on the ring-shaped member 75 in the boss hole 80*b* in the coupling member 76, which engagement will cause the coupling member 76 to be pivoted downward. Then, the boss 74 on the arm portion 73 is engaged into the boss hole 79*b* in the coupling member 76, so that the arm portion 73 will be pushed down against the force of the spiral extension spring 77. Thus, the rotating shaft 70 will be pivoted in a direction in which the lower lens cover 53 is closed.

Figure 13:
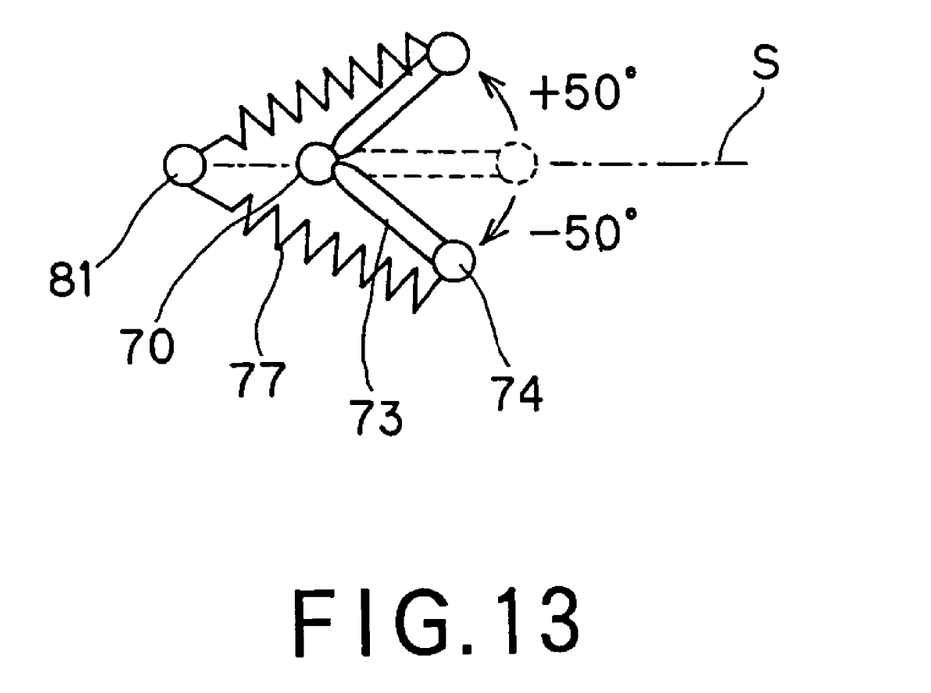
FIG. 13 is a schematic illustration of a toggle mechanism of the lens hood.

As schematically illustrated in FIG. 13, the spiral extension spring 77 forms a toggle mechanism. More specifically, depending upon at which side of a straight line S connecting the hook pin 81 on which the spiral extension spring 77 is hooked at the other end thereof and the center of rotation of the rotating shaft 70 of the lower lens cover 53 the boss 74 on the arm portion 73 on which the spiral extension spring 77 is hooked at one end thereof is positioned, the direction of the force applied to the free end of the arm portion 73 will be switched between a direction in which the lens cover is pivoted toward the closed position and a direction in which the lens cover is pivoted toward the opened position.

Then in the cover operating mechanism 56, the range of an angle in which each of the upper and lower lens covers 52 and 53 is pivotable is set to 100 deg. and the directions in which the arm portions 68 and 73 of the rotating shafts 64 and 70, respectively, are extended, respectively, are set for the above-mentioned straight line S to be parallel with the optical axis.

Also in the cover operating mechanism 56, the boss holes 80*a* and 80*b* in the coupling members 76, respectively, are elongated ones different in length from each other. More particularly, the boss hole 80*a* in the coupling member 76 coupled to the upper lens cover 52 is shaped to be about 1.5 mm longer than the boss hole 80*b* in the coupling member 76 coupled to the lower lens cover 53. Thus, the boss 78 in the ring-shaped member 75 will first touch the boss hole 80*b* in the coupling member 76 coupled to the lower lens cover 53.

Therefore, when closing the lens covers 52 and 53, the lower lens cover 53 will be closed by the cover operating mechanism 56 more early than the upper lens cover 52 so that the stepped overlapping portion 67 of the upper lens cover 52 can positively be made to overlap the free end of the lower lens cover 53. It should be noted that the upper and lower lens covers 52 and 53 will be opened simultaneously by the cover operating mechanism 56.

In the video camera 1 provided with the aforementioned lens hood 50, the upper and lower lens covers 52 and 53 housed inside the hood body 51 can easily be opened and closed by sliding the operating projection 55 of the cover operating mechanism 56 provided on the hood body 51.

Figure 7:
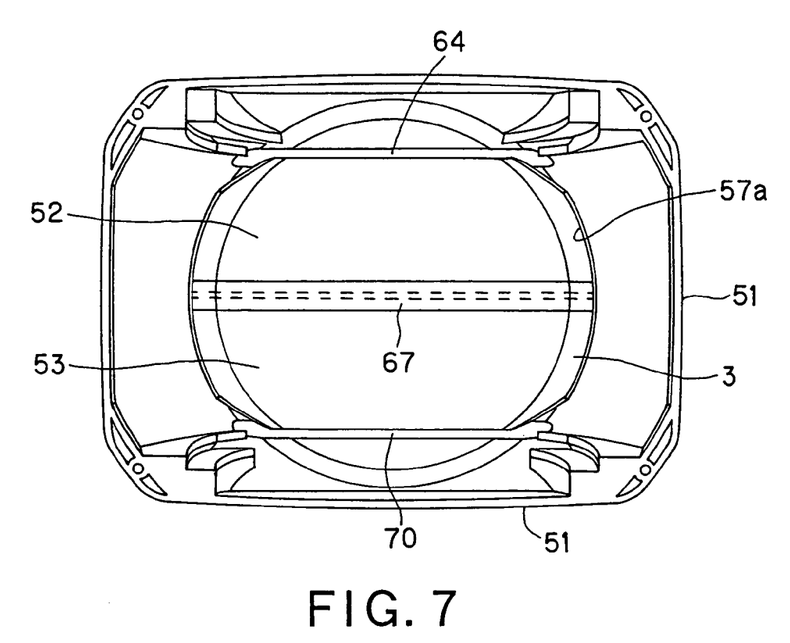
FIG. 7 is a plan view of the lens hood in FIG. 5, showing the pair of lens covers of the lens hood being in a closed position.
Figure 14:
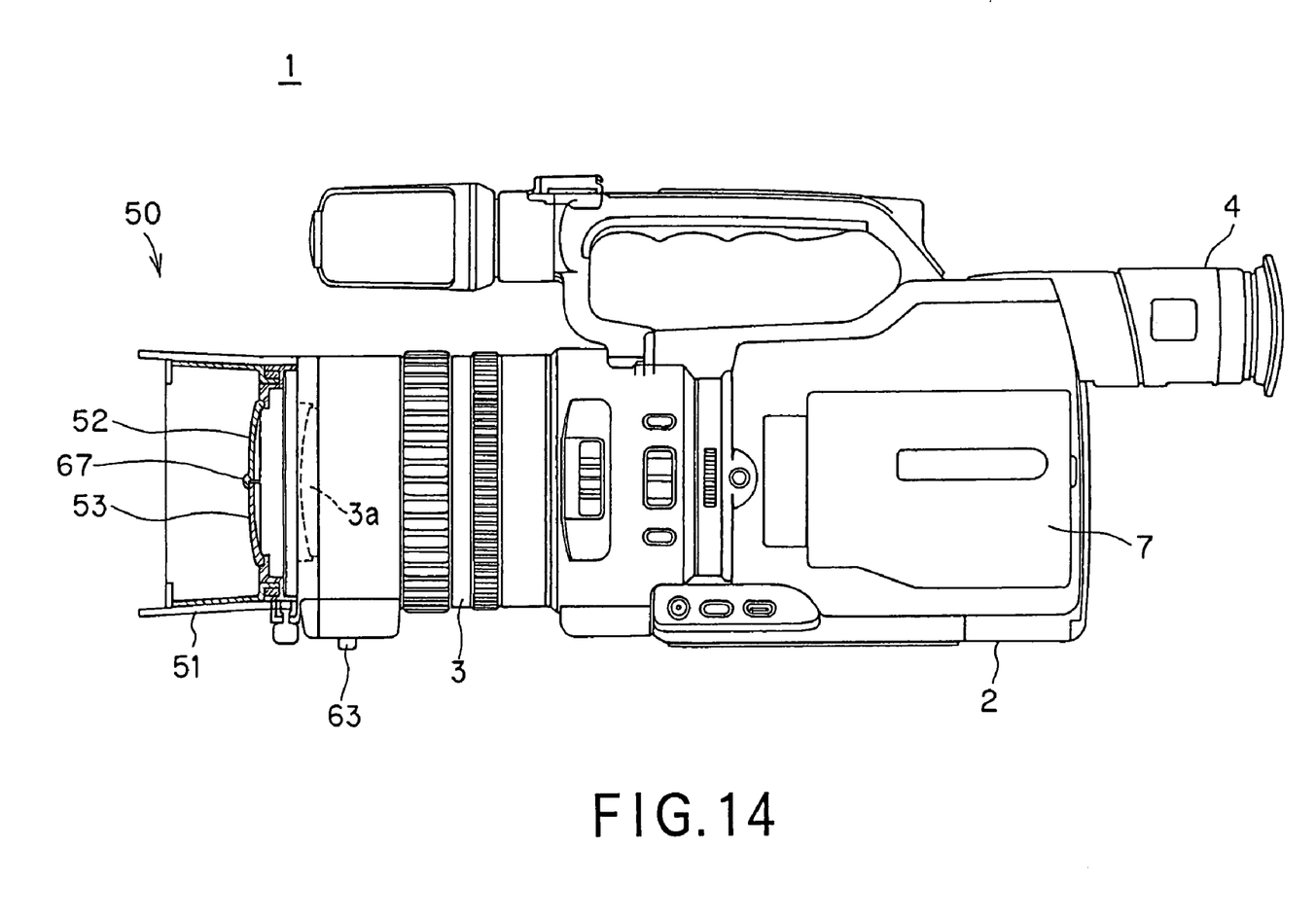
FIG. 14 is a perspective side elevation of the camera device shown in FIG. 2, showing the pair of lens covers of the lens hood attached to the camera device, being in the closed position.

With the lens covers 52 and 53 being closed as shown in FIGS. 7 and 14, they can positively protect the field lens 3*a* of the lens unit 3 against any damage to the field lens 3*a* and adhesion of dust to the field lens 3*a* by covering the field lens 3*a* of the lens unit 3.

Figure 9:
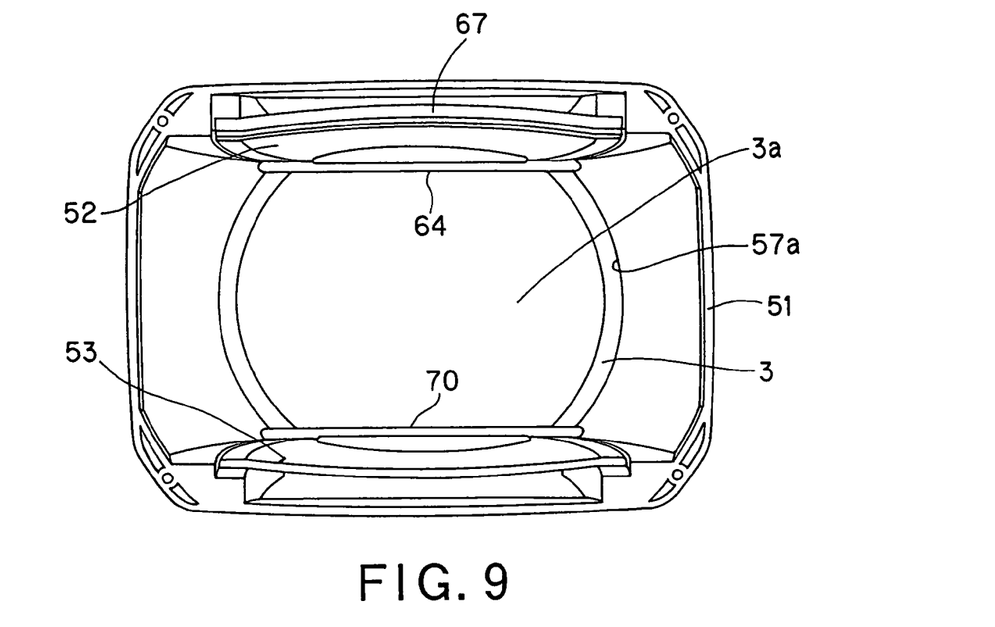
FIG. 9 is a plan view of the lens hood in FIG. 5, showing the pair of lens covers being in the opened position.
Figure 15:
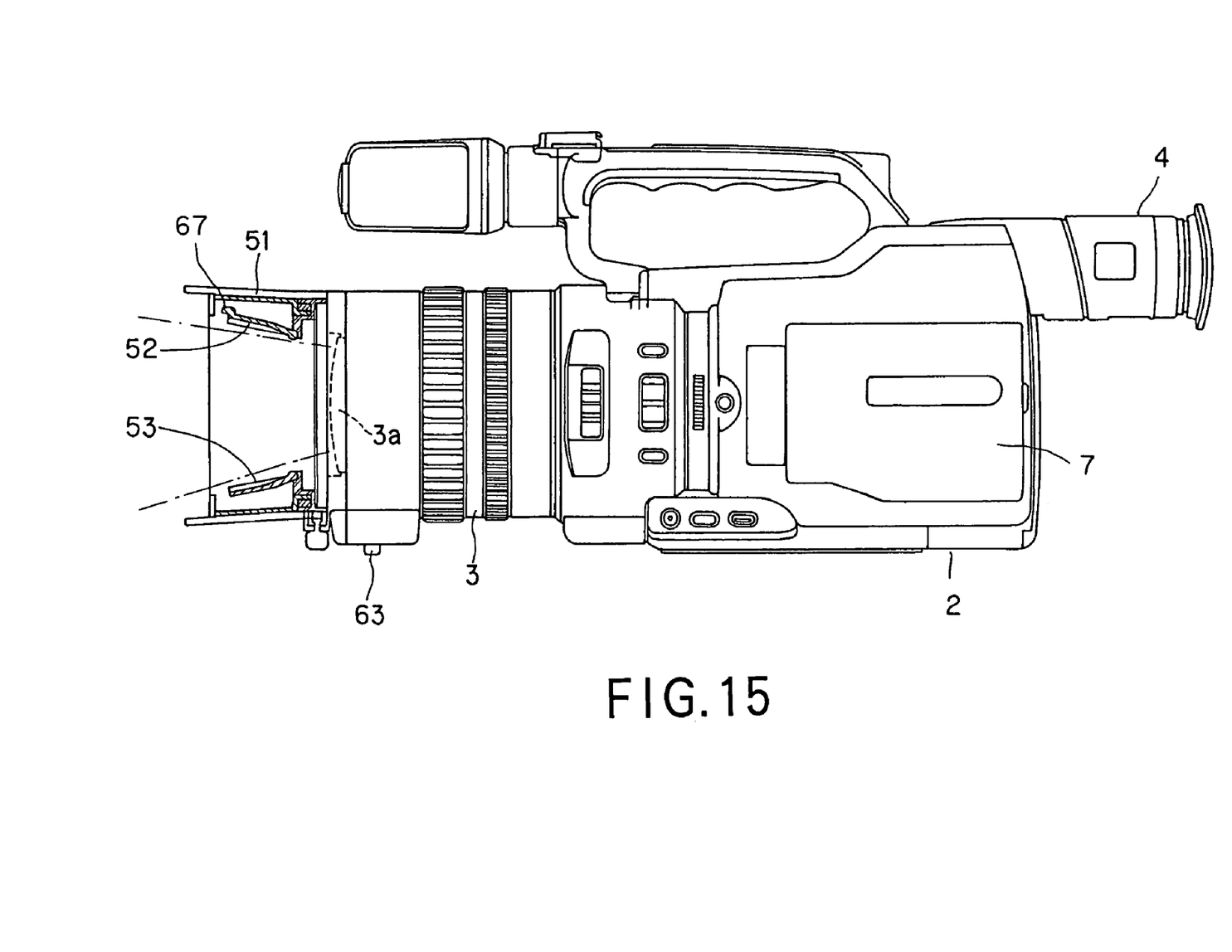
FIG. 15 is also a perspective side elevation of the camera device shown in FIG. 2, showing the pair of lens covers of the lens hood attached to the camera device, being in the opened position.

On the other hand, when the upper and lower lens covers 52 and 53 are opened from each other as shown in FIGS. 9 and 15, the hood body 51 will be moved to outside the field of view of the field lens 3*a* and hence can appropriately prevent unnecessary light from being incident upon the field lens 3*a*.

As having been described above, in the video camera 1 provided with the aforementioned lens hood 50, the lens covers 52 and 53 will not have to be attached or detached before or after each use of the video camera 1, the lens covers 52 and 53 will not interfere with the preparative operation of the video camera 1 for a photography, and the lens covers 52 and 53 can easily be opened and closed, which will further assure an improved operability of the video camera 1.

Especially, in case the video camera 1 is provided with the lens hood 50, the user can easily open and close the lens covers 52 and 53 by sliding the operating projection 55 located at the other lateral side of the lens hood 50 even while gripping the holder 6 of the device body 2 and peeping into the viewfinder 4, and can easily check whether the lens covers 52 and 53 are opened or closed. Therefore, the user quickly start an intended photography with the video camera 1 without having to re-holding the latter once.

Also, since the lens hood 50 can have the lens covers 52 and 53 thereof opened and closed inside the hood body 51, so it will not esthetically be spoiled and can be designed compact and lightweight.

Also, in the lens hood 50, since the lens covers 52 and 53 to be opened from each other are forced by the toggle mechanism formed by the spiral extension spring 77 in a direction in which they are pivoted toward the opened position while the lens covers 52 and 53 to be closed are forced by the toggle mechanism in a direction in which they are pivoted toward the closed position, so it is possible to prevent the lens covers 52 and 53 from being inadvertently opened or closed in the course of a photography or while the video camera 1 is being carried.

Also, the lens hood 50 can easily be attached to and detached from the video camera 1. For example, a conversion lens or the like installed to the lens unit 3 can be detected along with the lens covers 52 and 53 from the lens unit 3. Also, a filter or the like can be installed to the lens unit 3 with the lens hood 50 being left installed to the video camera 1.

Note that the present invention is not limited to the aforementioned lens hood 50 provided with the cover operating mechanism 56 which pivots the aforementioned upper and lower lens covers 52 and 53 between the opened and closed positions as the user slides the operating projection 55 about the optical axis of the field lens 3*a* (or in a direction perpendicular to the optical axis).

Figure 16:
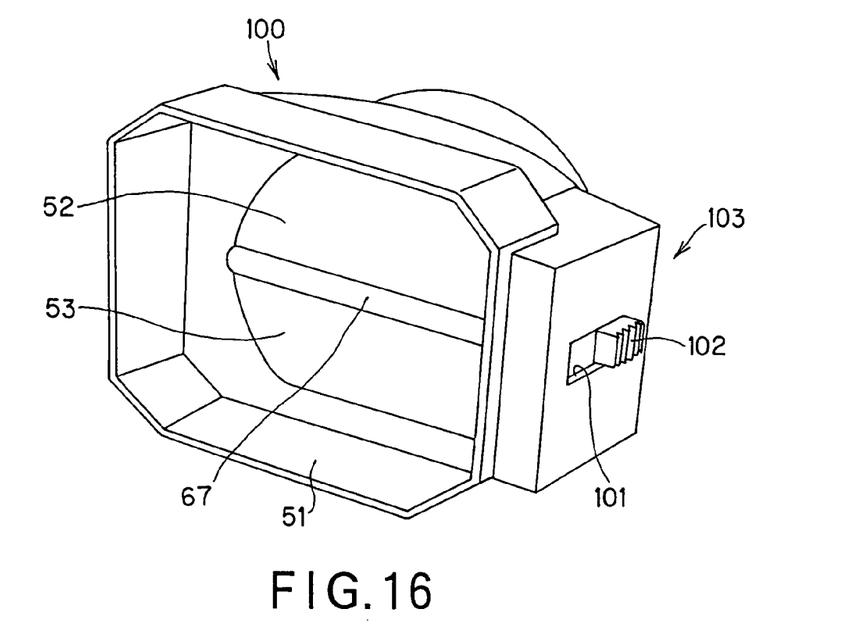
FIG. 16 is a perspective view of a variant of the lens hood according to the present invention.

For example, the lens hood 50 may be modified to be a lens hood 100 shown in FIG. 16. The lens hood 100 includes the hood body 51 having a sliding hole 101 formed therein, and a cover operating mechanism 103 adapted to pivot the aforementioned lower and upper lens covers 52 and 53 between the opened and closed positions by sliding an operating projection 102 provided in the cover operating mechanism 103 to face the outside through the sliding hole 101 in the direction of the optical axis of the field lens 3*a*.

Figure 17:
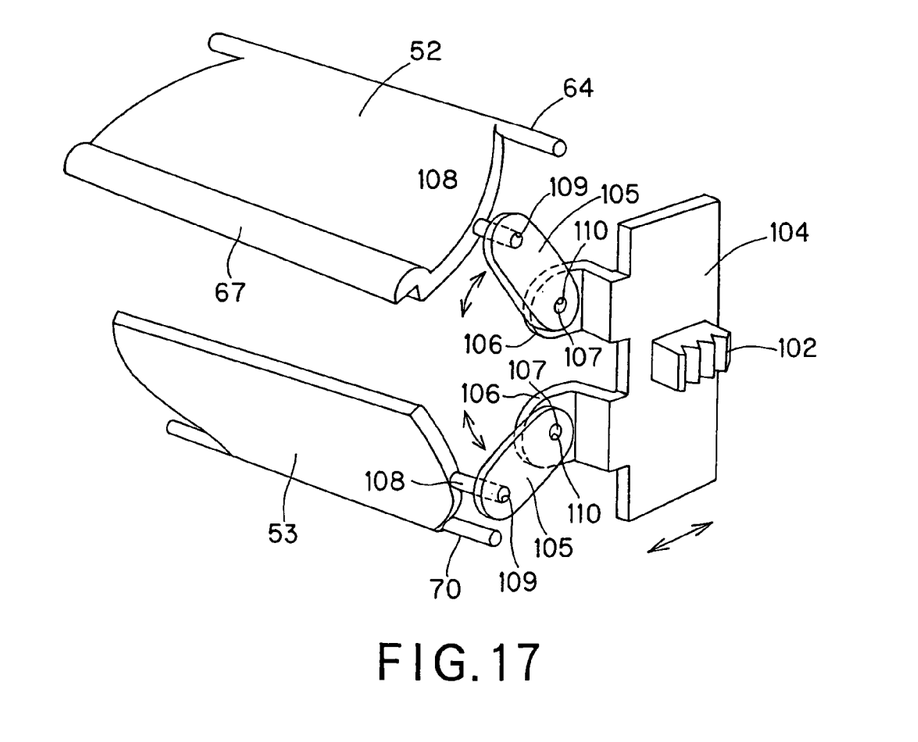
FIG. 17 is also a perspective view of the variant of the lens hood in FIG. 16, showing the internal structure of the lens hood.

More specifically, the cover operating mechanism 103 includes a sliding member 104 having the operating projection 102 provided thereon, and a pair of coupling members 105 to provide a coupling between the sliding member 104 and the upper and lower lens covers 52 and 53, as shown in FIG. 17.

The sliding member 104 has a pair of coupling member 106 provided at one sliding-directional side thereof and projected in parallel to each other. Each of the coupling members 106 has formed at the free end thereof a boss 107 projected outwardly.

Each of the coupling members 105 in pair has formed therein a coupling hole 109 in which a coupling pin 108 projected outwardly from one lateral side of each of the upper and lower lens covers 52 and 53, and a boss hole 110 in which a corresponding one of the bosses 107 formed on the sliding member 104 is engaged.

Therefore, in the cover operating mechanism 103 constructed as above, as the coupling members 105 in pair are pivoted in opposite directions, respectively, about the bosses 107, respectively, in conjunction with sliding of the operating projection 102 in the optical-axial direction, the aforementioned upper and lower lens covers 52 and 53 can appropriately be pivoted in opposite directions, respectively, between the opened and closed positions.

Also, although the upper and lower lens covers 52 and 53 in the closed position are opened outwardly as having been mentioned above, the lens hood may be designed so that the lens covers 52 and 53 in the closed position are opened inwardly.

Note that according to the present invention, the lens hood may be adapted so that a single circular lens cover housed in the hood body can be pivoted by the cover operating mechanism between a closed position where it will cover the lens and an opened position where it will be outside the field of view of the lens.

Also note that the present invention is not limited to the aforementioned video camera 1 but is widely applicable to imaging devices such as a still camera, to which a lens hood can be attached.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

The invention claimed is:

1. A lens hood for a lens, the lens hood comprising:
   a hood body attached to a front of the lens to reduce an amount of light incident upon the lens;
   a pair of lens covers installed inside the hood body so as to be pivotable about an axis perpendicular to an optical axis of the lens between a closed position where the lens covers cover the lens and an opened position where the lens covers are outside a field of view of the lens; and
   a cover operating mechanism that operates in conjunction with sliding of an operator installed slidably to the hood body to pivot the pair of lens covers in opposite respective directions to move the pair of lens covers between the opened and closed positions.

2. The lens hood according to claim 1, wherein the cover operating mechanism pivots the pair of lens covers between the opened and closed positions by sliding the operator about the optical axis of the lens.

3. The lens hood according to claim 1, wherein the cover operating mechanism pivots the pair of lens covers between the opened and closed positions by sliding the operator in a direction along the optical axis of the lens.

4. The lens hood according to claim 1, further comprising a toggle mechanism that operates in conjunction with the sliding of the operator to switch a direction of a force of a forcing means, applied to the pair of lens covers, between a direction in which the lens covers are pivoted toward the closed position and a direction in which the lens covers are pivoted toward the opened position.

5. The lens hood according to claim 1, wherein the lens covers overlap one another at free end portions thereof in the closed position to cover the lens.

6. An imaging device comprising:
   a device body;
   a lens unit provided at a front of the device body and having a field lens facing forward; and
   a lens hood attached to a front of the lens unit, the lens hood including:
   a hood body attached to a front of the field lens to reduce an amount of light incident upon the field lens;
   a pair of lens covers installed inside the hood body so as to be pivotable about an axis perpendicular to an optical axis of the field lens and between a closed position where the lens covers cover the lens field and an opened position where the lens covers are outside a field of view of the field lens; and
   a cover operating mechanism that operates in conjunction with sliding of an operator installed slidably to the hood body to pivot the lens covers in opposite directions, respectively, and to move the pair of lens covers between the opened and closed positions.

7. The imaging device according to claim 6, wherein:
   the device body has:
   a holder fixed to one lateral side thereof and that a user grips to hold the imaging device; and
   a finder and/or a display unit provided at a back of the device body and/or at a side opposite to the one lateral side of the device body, respectively, and in and/or on which an image captured through the field lens is displayed; and
   the operator of the cover operating mechanism is located at a side of the hood body opposite to the one lateral side of the device body.

8. The imaging device according to claim 6, wherein the lens hood is removably attachable to the lens unit.

\* \* \* \* \*